United States Patent
Jaffer et al.

(10) Patent No.: US 8,225,331 B2
(45) Date of Patent: Jul. 17, 2012

(54) PROVIDING INTERFACE SUPPORT FOR APPLICATION WORKSPACE PERSISTENCE

(75) Inventors: Akbar Jaffer, Union City, CA (US); Richard Dean Day, Ashburn, VA (US)

(73) Assignee: Oracle International Corporation, Redwood Shores, CA (US)

( * ) Notice: Subject to any disclaimer, the term of this patent is extended or adjusted under 35 U.S.C. 154(b) by 1095 days.

(21) Appl. No.: 12/118,363

(22) Filed: May 9, 2008

(65) Prior Publication Data

US 2009/0282421 A1 Nov. 12, 2009

(51) Int. Cl.
*G06F 15/163* (2006.01)
(52) U.S. Cl. .................. 719/317; 705/7.42; 705/304
(58) Field of Classification Search ............... 705/7.42, 705/304, 26.41; 379/265.08, 265.09, 265.02; 719/317
See application file for complete search history.

(56) References Cited

U.S. PATENT DOCUMENTS

| | | | |
|---|---|---|---|
| 4,694,483 A * | 9/1987 | Cheung | 379/265.06 |
| 5,327,490 A * | 7/1994 | Cave | 379/266.01 |
| 6,535,492 B2 * | 3/2003 | Shtivelman | 370/270 |
| 6,922,689 B2 * | 7/2005 | Shtivelman | 1/1 |
| 2005/0193055 A1 * | 9/2005 | Angel et al. | 709/202 |
| 2008/0052377 A1 * | 2/2008 | Light | 709/218 |
| 2009/0041226 A1 * | 2/2009 | Jabbour et al. | 379/265.1 |

* cited by examiner

*Primary Examiner* — H. S. Sough
*Assistant Examiner* — Brian Wathen
(74) *Attorney, Agent, or Firm* — Campbell Stephenson LLP

(57) ABSTRACT

The method and system of the present invention include recording a first transition by an agent interface between a first session and a second session of a plurality of sessions in a communication utility. The first transition is recorded in a transition record. Responsive to receipt of a request to initiate a third session by the communication utility, a transition frequency is determined using the transition record. Whether to accept the request to initiate the third session is determined using the transition frequency, and the request to initiate the third session is accepted.

20 Claims, 9 Drawing Sheets

PROVIDING INTERFACE SUPPORT FOR APPLICATION WORKSPACE PERSISTENCE

BACKGROUND

Agent interfaces are becoming increasingly sophisticated in their ability to allow access to numerous types of application data and/or application systems across multiple forms of communication. For example, a typical customer service application may include an agent interface to allow a customer service agent to navigate among a variety of types of data related to a customer and to products. Such product data may include a knowledge base or other database of product information, while customer data may include contact information, service request information, order information, activity information, and so on. A customer service agent interacting with a set of customers may need to navigate quickly all of these types of information during, for example, the course of a parallel set of chat conversations involving several different customers in separate chat (or other pseudo-real-time communication) sessions.

In order to provide prompt and personalized service when processing the needs of several customers in parallel, it is desirable that customer service agents appear to "know" the customer immediately when starting an interaction and throughout its duration. Since customer service centers receive a large volume and variety of customer interactions during a typical day, each agent needs to have quick access to important customer information, such as contact name, account number, phone number, and so on, for the customer with whom the agent is dealing. Additionally, customer service agents need to find, in the most efficient manner possible, the information needed by the customer. When an agent wastes time by fumbling with an agent interface for a search engine, suggesting to a customer an inapplicable resource, or offering otherwise inapplicable advice, costs are increased. These costs come in both the form of agent time and the form of customer dissatisfaction.

SUMMARY

The method and system of the present invention include recording a first transition by an agent interface between a first session and a second session of a plurality of sessions in a communication utility. The first transition is recorded in a transition record. Responsive to receipt of a request to initiate a third session by the communication utility, a transition frequency is determined using the transition record. Whether to accept the request to initiate the third session is determined using the transition frequency, and the request to initiate the third session is accepted.

BRIEF DESCRIPTION OF THE DRAWINGS

The present invention may be better understood, and its numerous objects, features and advantages made apparent to those skilled in the art by referencing the accompanying drawings.

Figure 1:
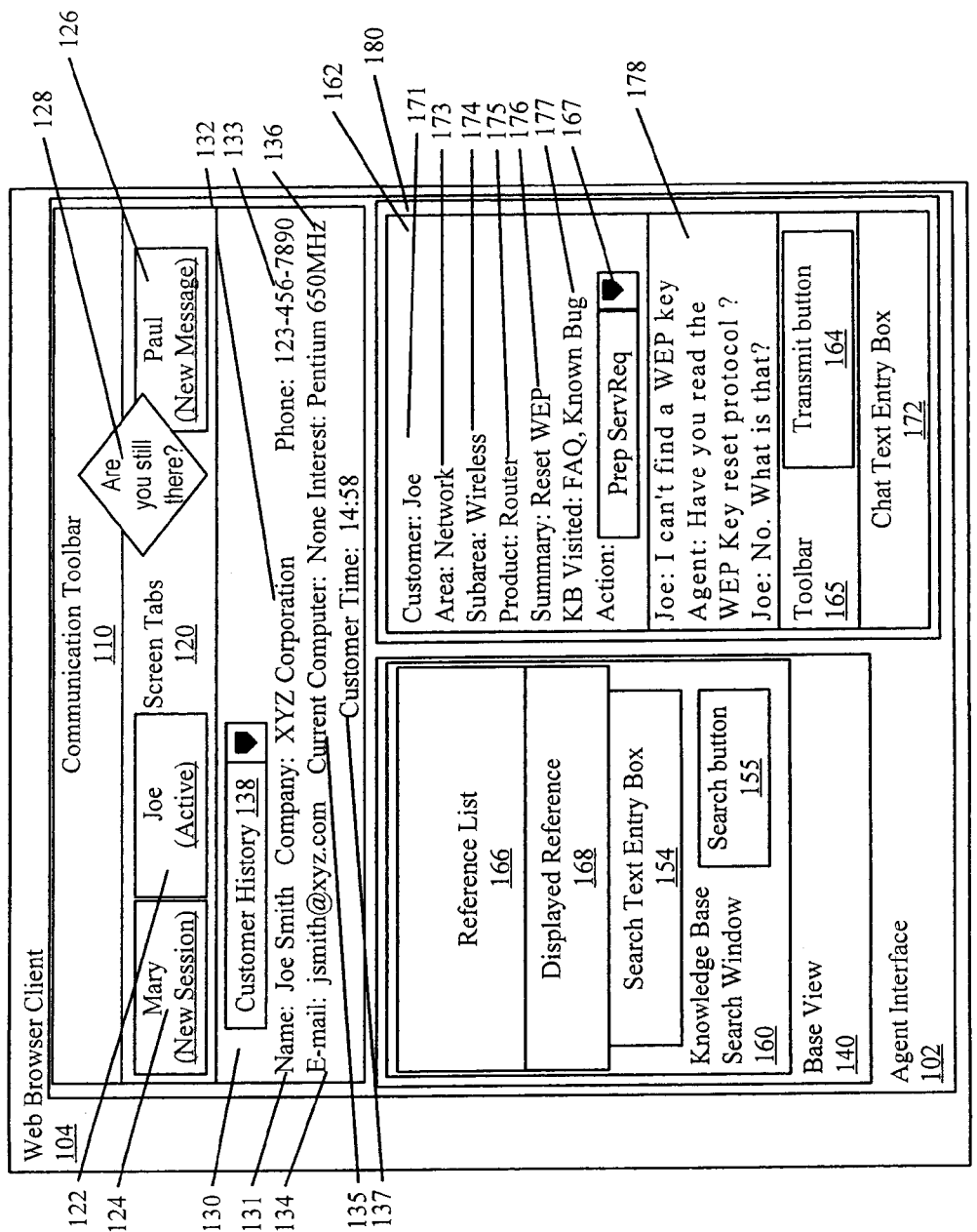
FIG. 1 provides an example of an agent interface including both a chat utility and a search utility supporting application workspace persistence in accordance with one embodiment of the present invention.

The use of the same reference symbols in different drawings indicates similar or identical items. While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings. Although the present invention is described in connection with one or more embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent in light of the present disclosure, however, to one skilled in the art that the invention can be practiced without these specific details.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention addresses several shortcomings of existing techniques. Specifically, one embodiment of the present invention provides for the ability to provide and monitor a persistent workspace for each session in a parallel set of multiple chat sessions. An agent interface provides a set of display controls representing each of a series chat sessions. When a new message arrives for one of the sessions, the display control is visually adjusted to indicate the presence of the new message, and the new message can be reviewed by passing a mouse pointer over the display control. By selecting a display control, an agent can transition from session to session. Each time that a session transition occurs, the state of the agent interface, including applications, is logged for restoration when the agent returns to interaction with that session. Further, an agent interface determines whether to accept a chat request on the basis of a transition frequency between sessions.

FIG. 1 provides an example of an agent interface including both a chat utility and a search utility supporting application workspace persistence in accordance with one embodiment of the present invention. FIG. 1 shows an agent interface 102 presented for agent use by a web browser client 104. In one embodiment, no client software other than a generic web browser is needed to support agent interface 102 for the host application. Agent interface 102 includes a communication toolbar 110, screen tabs 120, a persistent dashboard 130, a chat window 180 and a base view 140. Base view 140 contains a knowledge base search window 160 containing a search text entry box 154 and a search button 155. Communication toolbar 110 and knowledge base search window 160 are not essential for the operation of application workspace persistence in accordance with the present invention, and screen tabs 120 may be located elsewhere, such as, for example, toolbar 165. Knowledge base search window contains a reference list 166 and a displayed reference 168. Base view 140 represents a display window in which application data are displayed, such that the dashboard 130 provides context information related to the application data.

Communication toolbar 110 enables an agent to communicate via multiple types of communication channels, such as e-mail, telephone, facsimile, text chat and wireless messaging. Screen tabs 120 enable an agent to navigate multiple types of data among multiple sessions, each with a different customer.

Chat window 180 supports communication between a customer and an agent through text-based messaging, which can include transmission of messages containing a markup language such as HTML, for example. In some embodiments, the chat window can additionally support moving video and audio communication. A customer information pane 162 provides information relevant to a customer interaction, such as a username 171, which may contain any identifier used to communicate with a customer, such as a customer's name, username or handle. An area 173 broadly represents a product or service type of interest to the customer on the basis of the customer's indication of interest or data previously stored in relation to the customer. A subarea 174 more narrowly defines the product or service type of interest to the customer on the basis of the customer's indication of interest or data previously stored in relation to the customer. A product 175 defines the specific offering of interest to the customer on the basis of the customer's indication of interest or data previously stored in relation to the customer. A summary 176 provides a brief description of the problem that the customer is trying to solve. KB visited 177 indicates the portions of a knowledge base that the customer has reviewed, typically before communicating with a live agent. An action pulldown menu 167 enables an agent to quickly access actions that may be relevant to the customer's situation, such as preparation of a service request. A chat text entry box 172 allows the agent to enter text for transmission to a customer.

A session window 178 displays a record of transmissions between an agent and a customer. A toolbar 165 allows for the placement of buttons, such as transmit button 164.

In the exemplary embodiment shown in FIG. 1, persistent dashboard 130 includes various data fields such as contact name 131, company 132, phone 133, e-mail 134, current computer 135, interest 136, and customer time 137. Persistent dashboard 130 also includes customer history combo box 138, which enables the agent to view in base view 140 the history of previous communications with the customer whose information is displayed in persistent dashboard 130. As mentioned above, the data fields included in a persistent dashboard, such as persistent dashboard 130, are configurable according to the present invention. For example, an account number, customer's local time, or other relevant context information can be selected to be displayed in persistent dashboard 130. Furthermore, customer dashboard 130 may be configured to include, for example, Previous and Next buttons (not shown) to enable scrolling to and from information related to previous activity of the agent using the host application, such as calls that the agent had previously attended to during a session using the host application.

In the example embodiment shown, persistent dashboard 130 is visible as a separate frame below the communications toolbar 110 and screen tabs 120 and above the frame including base view 140. In base view 140, the agent can navigate among various types of application data and/or different screens and views of agent interface 102, while persistent dashboard 130 provides a persistent view of context information related to the application data presented in base view 140. For example, the customer service agent can quickly navigate to information related to the active customer in persistent dashboard 130 by selecting from the combo box 138 of persistent dashboard 130. The list of views to which the agent can navigate is customizable and, for example, may include the following:

Contact—Activities (default)
Contact—Activity Plans
Contact details
Contact—Service Requests
Contact—Agreements
Contact—Entitlements
Contact—Campaigns
Contact—Opportunities.

When a view is selected, one or more records related to the active customer are displayed in base view 140.

In one embodiment of the present invention, a website for a customer provides access to a repository of information in a knowledge base and an interface for participating in chat supported by chat window 180. When the customer requests a chat with an agent, persistent dashboard 130 and customer information pane 162 are populated with the gathered data that is passed in the chat request. A search is also performed, using the data from persistent dashboard 130 and customer information pane 162. Reference list 166 is populated with the results of the search, and an agent can select a reference to be shown in a window as displayed reference 168. The search performed to populate reference list 166 and the references displayed (as well as their manner of display) are configurably altered on the basis of the searches performed by the customer prior to the initiation of a chat session and the results viewed by the customer.

The context information displayed in persistent dashboard 130 is changed in response to certain actions, which are referred to herein as changes in context. For example, a change in context can include receiving a communication event, obtaining data entered by a customer, focusing on a data record, and selecting a search results record. Actions such as switching to a new screen or view of the agent interface, or viewing a different type of application data, are not considered to trigger changes in context unless accompanied by one of the aforementioned context-changing actions. In one embodiment of the present invention, a new search is performed and references displayed in reference list 166 are updated in response to configurably-selected changes in context. Changing of the view or viewing of a different type of data at base window 140 followed by selection of an update button (not shown) on the persistent dashboard 130 also changes the context of the dashboard.

Once populated, the search results remain in knowledge base search window 160 until another search occurs or until a Clear Search command is executed, even when the display window including knowledge base search window 160 is closed. Search data in knowledge base search window 160 is updated so that, when the agent re-opens a display window for knowledge base search window 160, the context information pertains to the currently active customer and application data.

Additionally, knowledge base search window 160 may be configured to include a button in a display window to update dashboard data displayed with information related to application data also being displayed by agent interface 102.

In one embodiment, knowledge base search window 160 is configured to include an Open Search icon (not shown) and a Close Search icon (not shown) that can be selected to open knowledge base search window 160. In this embodiment, the commands Open Search, Close Search, and Clear Search can also be accessed from an application menu (not shown) using a View command.

Session tabs 122-126 provide navigation between separate sessions with customers. An active session tab 122 indicates the session for which data is currently displayed in base view 140, chat window 180, and persistent dashboard 130. In the exemplary embodiment depicted in FIG. 1, active session tab 122 is rendered visibly distinct by the presence of the word "active". In other embodiments of the present invention, changes of color or highlighting can be used to provide visual distinction without departing from the scope of the present invention.

A new session tab 124 indicates a session recently accepted by agent interface 102, for which data is not currently displayed in base view 140, chat window 180, and persistent dashboard 130. In the exemplary embodiment depicted in FIG. 1, new session tab 124 is rendered visibly distinct by the presence of the word "new". In other embodiments of the present invention, changes of color or highlighting can be used to provide visual distinction without departing from the scope of the present invention.

A message waiting session tab 126 indicates the session for which data is not currently displayed in base view 140, chat window 180, and persistent dashboard 130, which has received new communication from the customer. In the exemplary embodiment depicted in FIG. 1, active session tab 122 is rendered visibly distinct by the presence of the word "active". In other embodiments of the present invention, changes of color or highlighting can be used to provide visual distinction without departing from the scope of the present invention. By passing a mouse pointer or other pointing and selection user interface element over message waiting session tab 126, an agent causes a display bubble 128 to display the contents of the most recent transmission for the session represented by message waiting session tab 126. An additional session tab, which is not shown, can indicate an inactive session for which no new communication has been received.

When an agent selects message waiting session tab 126, new session tab 124 or another inactive session tab, the status of base view 140, chat window 180 and persistent dashboard 130 is logged for the session represented by active session tab 122. The status of base view 140, chat window 180 and persistent dashboard 130 is logged for the session represented by active session tab 122 is restored when the agent returns to the session. The occurrence of the transition between sessions is also logged.

In one embodiment, when an incoming communication arrives and notification is provided to the agent by new session tab 124, persistent dashboard 130 is automatically updated with key information about the caller, such as the contact name and customer's local time, which is displayed in persistent dashboard 130 when the agent selects new session tab 124. While this information enables the agent to greet the customer using the proper salutation, the host application retrieves further information about the contact and displays customer-specific information. As persistent dashboard 130 is being populated, a search is also performed, using the data from persistent dashboard 130 and customer information pane 162. Reference list 166 is populated with the results of the search, and an agent can select a reference to be shown in a window as displayed reference 168.

Figure 2A:
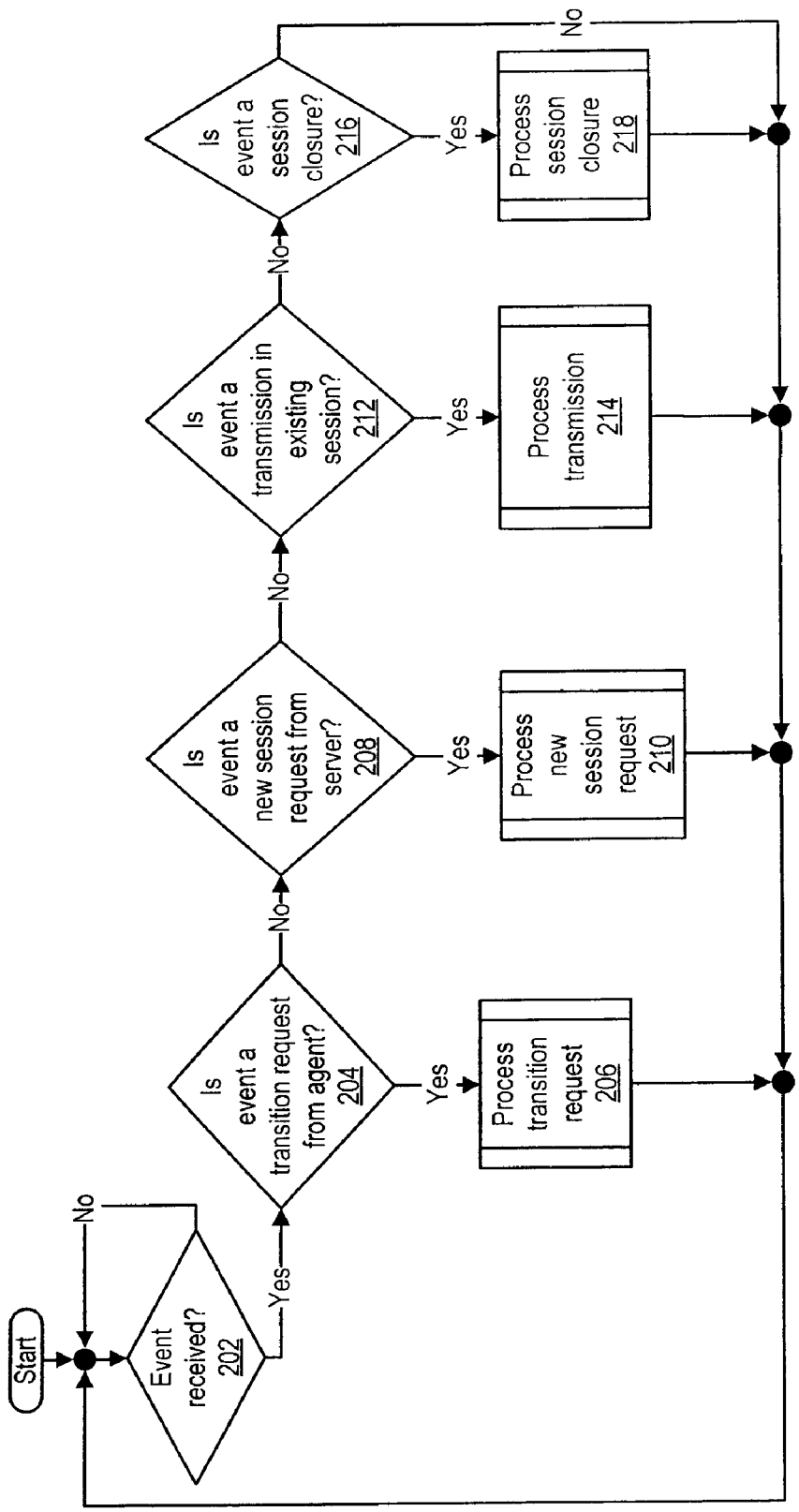
FIG. 2A is a flowchart describing one embodiment of an event-handling process to support application workspace persistence in accordance with the present invention.

FIG. 2A is a flowchart describing one embodiment of an event-handling process to support application workspace persistence in accordance with the present invention. The process starts at step 202, which depicts agent interface 102 determining whether an event has been received from a communication server. If agent interface 102 determines that an event has been received from a communication server, then the process next moves to step 204.

Step 204 illustrates agent interface 102 determining whether the received event represents a request from an agent for a transition between sessions. In one embodiment of the present invention, a transition between sessions can be requested by an agent by selecting message waiting session tab 126, new session tab 124 or another inactive session tab. If agent interface 102 determines that the received event represents a request from an agent for a transition between sessions, the process next moves to step 206. Step 206 illustrates agent interface 102 processing, as described with respect to FIG. 2B, the transition request identified in step 204. The process then returns to step 202, which is described above.

Figures 2B, 2C, 2D, 2E:
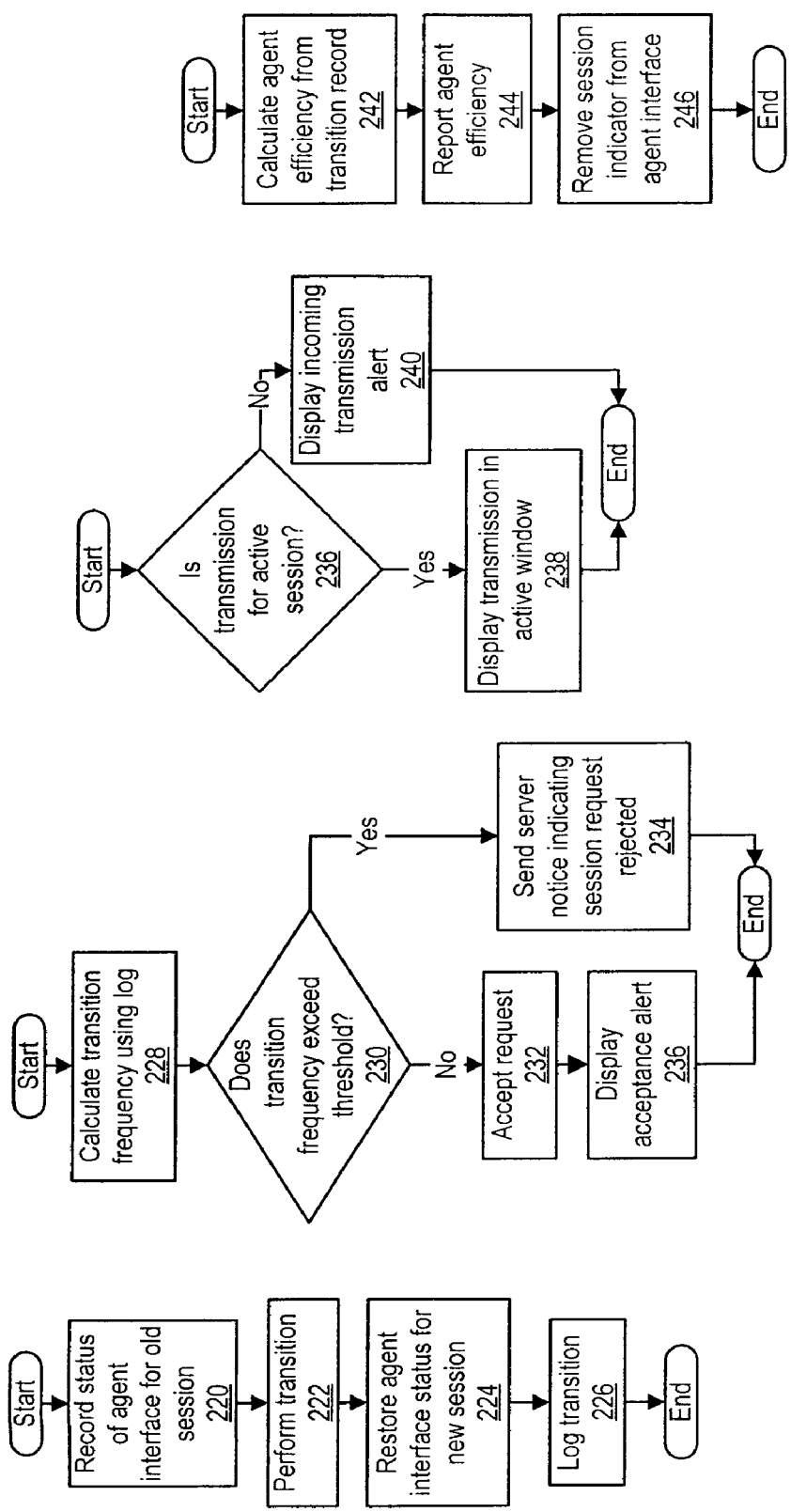
FIG. 2B is a flowchart describing one embodiment of a session transition process to support application workspace persistence in accordance with the present invention.
FIG. 2C is a flowchart describing one embodiment of a session initiation process to support application workspace persistence in accordance with the present invention.
FIG. 2D is a flowchart describing one embodiment of a transmission reception process to support application workspace persistence in accordance with the present invention.
FIG. 2E is a flowchart describing one embodiment of a session closure process to support application workspace persistence in accordance with the present invention.
Figure 3:
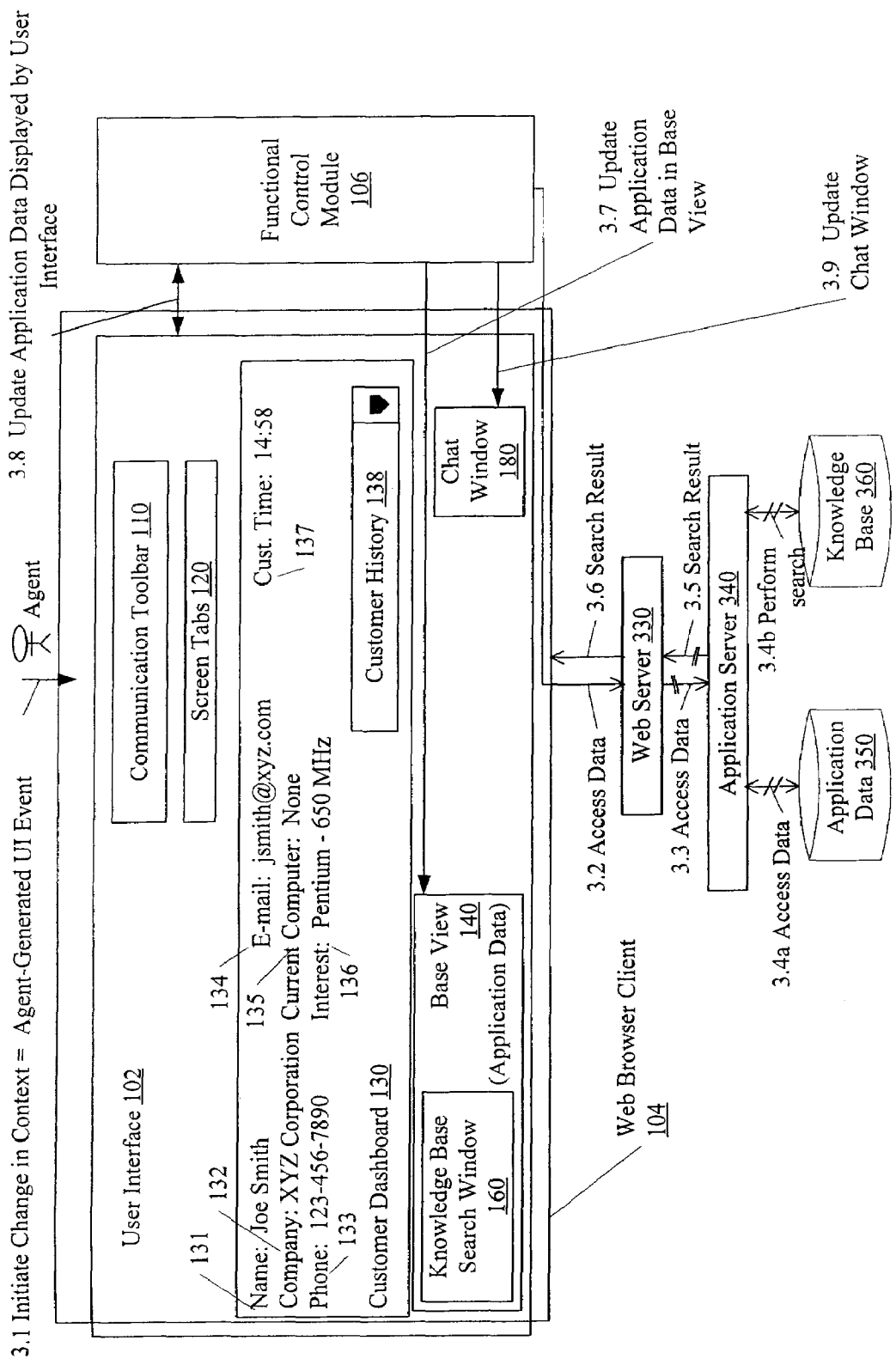
FIG. 3 shows actions taken when operating an agent interface with application workspace persistence in response to agent input in accordance with one embodiment of the present invention.

Returning to step 204, if agent interface 102 determines that the received event does not represent a request from an agent for a transition between sessions, the process next moves to step 208, which depicts agent interface 102 determining whether the received event represents a request from a communication server, which is illustrated in FIG. 3 below, to initiate a new session. If agent interface 102 determines that the received event represents a request from a communication server to initiate a new session, the process next moves to step 210. Step 210 illustrates agent interface 102 processing, as described with respect to FIG. 2C, the new session request identified in step 208. The process then returns to step 202, which is described above.

Returning to step 208, if agent interface 102 determines that the received event does not represent a request from a communication server to initiate a new session, the process next moves to step 212, which depicts agent interface 102 determining whether the received event represents an incoming transmission for an existing session. If agent interface 102 determines that the received event represents an incoming transmission for an existing session, then the process next moves to step 214. Step 214 illustrates agent interface 102 processing, as described with respect to FIG. 2D, the incoming transmission. The process then returns to step 202, which is described above.

Returning to step 212, if agent interface 102 determines that the received event does not represent an incoming transmission for an existing session, then the process next moves to step 216, which depicts agent interface 102 determining whether the received event represents a session closure for an existing session. In one embodiment of the present invention, session closure can result from either a request from an agent to close a session or a loss of a connection to a customer. If agent interface 102 determines that the received event does not represent a session closure for an existing session, then the process returns to step 202, which is described above. If agent interface 102 determines that the received event represents a session closure for an existing session, then the process next moves to step 218, which depicts user interface 102 processing, as described with respect to FIG. 2E, the session closure.

FIG. 2B is a flowchart describing one embodiment of a session transition process to support application workspace persistence in accordance with the present invention. The process starts at step 220, which depicts user interface 102 recording a state of agent interface 102, including persistent dashboard 130, chat window 180 and base view 140, typically to application data 350. The process next moves to step 222. Step 222 illustrates agent interface 102 performing the transition by adjusting screen tabs 120 to reflect the new status of each session. The process then proceeds to step 224, which depicts agent interface 102 restoring the status of agent interface 102 for the newly-selected session. If a state of agent interface 102, including persistent dashboard 130, chat window 180 and base view 140, is available in application data 350, then the previous state is restored. Otherwise, agent interface 102, generates a state of persistent dashboard 130, chat window 180 and base view 140, typically from application data 350.

The process then moves to step 226. Step 226 illustrates user interface logging the transition between sessions that has been requested by the agent to a transition record (which is typically stored in application data 350 of FIG. 3, which is described below). The process then ends.

FIG. 2C is a flowchart describing one embodiment of a session initiation process to support application workspace persistence in accordance with the present invention. The process starts at step 228, which depicts agent interface 102 determining (by calculating) a transition frequency using the transition record referenced with respect to step 226. The process next moves to step 230. Step 230 illustrates the agent interface 102 determining whether the transition frequency determined in step 216 exceeds a threshold value past which additional sessions are not allowed. If agent interface 102 determines that the transition frequency determined in step 228 does not exceed the threshold value past which additional sessions are not allowed, then the process proceeds to step 232 which depicts user interface 102 accepting the request for a new session. The process next moves to step 236. Step 236 depicts user interface 102 displaying an acceptance alert, such as new session tab 124. The process then ends.

Returning to step 230, if agent interface 102 determines that the transition frequency determined in step 228 exceeds a threshold value past which additional sessions are not allowed, then the process next moves to step 234. Step 234 illustrates agent interface 102 rejecting the request for a new chat session by sending to a communication server a notice indicating that the request is rejected because agent interface 102 is currently processing a maximum number of sessions. The process then ends.

FIG. 2D is a flowchart describing one embodiment of a transmission reception process to support application workspace persistence in accordance with the present invention. The process begins at step 236, which depicts agent interface 102 determining whether the transmission identified in step 212 is intended for the active session displayed in chat window 180. If agent interface 102 determines that the transmission identified in step 212 is intended for the active session displayed in chat window 180, then the process proceeds to step 238. Step 238 illustrates agent interface 102 displaying the transmission identified in step 212 in chat window 180. The process then ends.

Returning to step 236, if agent interface 102 determines that the transmission identified in step 212 is not intended for the active session displayed in chat window 180, then the process proceeds to step 240, which depicts agent interface 102 displaying an incoming transmission alert, such as message waiting session tab 126. The process then ends.

FIG. 2E is a flowchart describing one embodiment of a session closure process to support application workspace persistence in accordance with the present invention. The process begins at step 242, which depicts agent interface 102 calculating an agent efficiency using the transition record referenced in step 230. The process next moves to step 244. Step 244 illustrates agent interface 102 reporting to a communication server the agent efficiency calculated in step 242. The process next moves to step 246, which depicts user interface 102 removing a session indicator for the closed session from communication tabs 120.

FIG. 3 shows actions taken when operating an agent interface with application workspace persistence in response to agent input in accordance with one embodiment of the present invention. When an agent requests a session transition using session tabs 122-126, a query of application data 350 is initiated, which in turn updates base view 140, chat window 180 and persistent dashboard 130. In action 3.1, the agent initiates a query by, for example, selecting message waiting session tab 126. In action 3.2, functional control module 106, which is actually housed on application server 340 but displayed separately for purposes of clarity, passes a request to access data to web server 330. In action 3.3, web server 330 passes the request to access application data to application server 340. Application server 340 includes a session maintenance business service (not shown) to assist with obtaining data to push to base view 140, chat window 180 and persistent dashboard 130. As noted by the broken arrow connecting web server 330 to application server 340, intermediate software modules may be present between web server 330 and application server 340.

Application server 340 accesses application data 350, such as customer data from a customer and previous states of base view 140, chat window 180 and persistent dashboard 130 and items viewed by customer and agent, in action 3.4a and performs a search of knowledge base 360 in action 3.4b. As noted by the broken arrows connecting application server 340 to application data 350 and knowledge base 360, several intermediate modules may be present, such as a database server (not shown). Application server 340 provides search results to web server 330 in action 3.5, and web server 330 provides search results to web browser client 104 in action 3.6. In action 3.7, functional control module 106 updates data in base view 140 with a reference list 166 in knowledge base search window 160. In action 3.8, functional control module 106 updates any additional application data displayed by agent interface 102. In action 3.9, functional control module 106 updates chat window 180.

Figure 4:
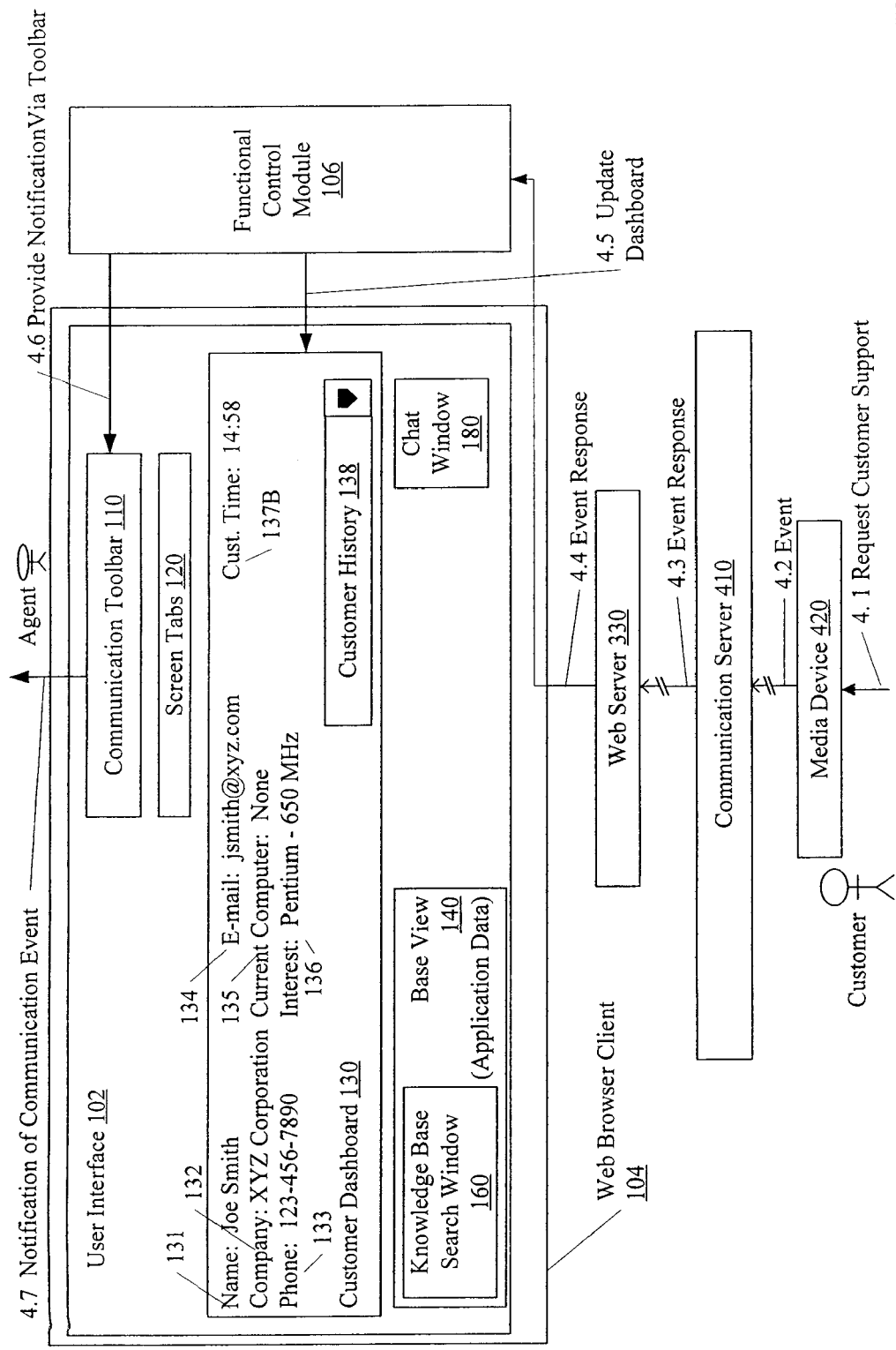
FIG. 4 shows actions taken to support application workspace persistence in response to an incoming communication event in accordance with one embodiment of the present invention.

FIG. 4 shows actions taken to support application workspace persistence in response to an incoming communication event in accordance with one embodiment of the present invention. In action 4.1, the customer places a request for customer support, such as chat, using media device 420. A request for customer support will typically include any known information about the customer, including data gathered to populate persistent dashboard 130 and customer information pane 162.

The request for customer support is provided via a series of intermediate software modules (not shown) to communication server 410. Communication server 410 receives the event and provides an event response in action 4.3 to web server 330. Again, as indicated by the broken arrow connecting communication server 410 and web server 330, intermediate software modules may exist between communication server 410 and web server 330. Web server 330 provides the event response in action 4.4 to web browser client 104, and functional control module 106 updates persistent dashboard 130 with context information related to the incoming communication event in action 4.5. This context information may include, for example, the name of the customer initiating the telephone call or a chat. In action 4.6, functional control module 106 provides notification of the incoming communication event to communication toolbar 110 and screen tabs 120. If the request for chat is accepted in step 218 of FIG. 2A, communication toolbar 110 then provides notification of the communication event in action 4.7 to the customer service agent, for example, by causing new session tab 124 to blink.

Figure 5:
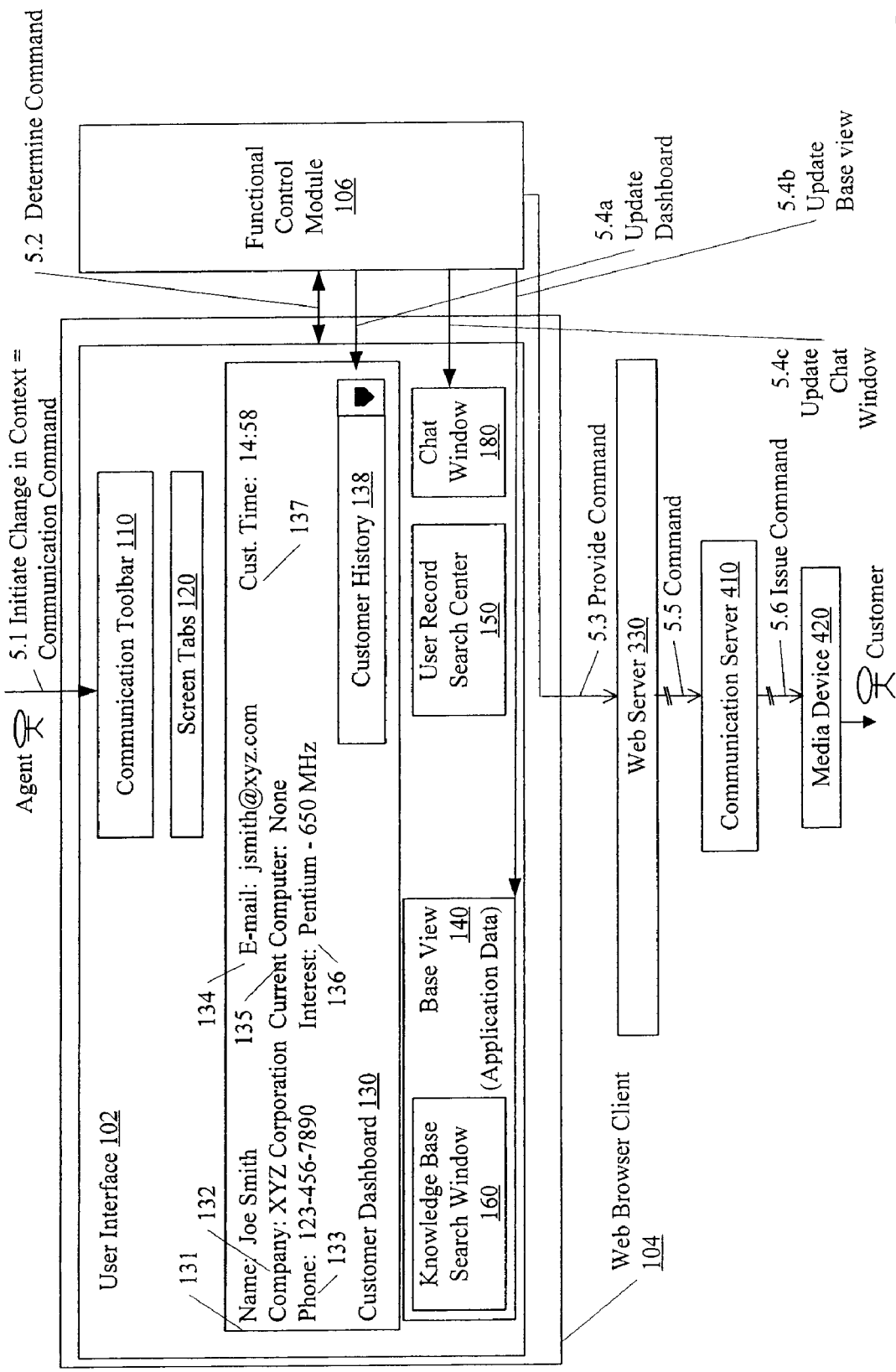
FIG. 5 shows actions taken when updating the persistent dashboard supporting application workspace persistence in conjunction with an outgoing communication command in accordance with one embodiment of the present invention.

FIG. 5 shows actions taken when updating the persistent dashboard supporting application workspace persistence in conjunction with an outgoing communication command in accordance with one embodiment of the present invention. Issuing a communication command is similar to the agent-generated agent interface events described with reference to FIG. 3, although other software modules, such as communication server 410 of FIG. 4, are involved. In action 5.1, the customer service agent clicks new session tab 124 to transition to the session represented by new session tab 124. The resulting communication command produces a change in context that is used to update persistent dashboard 130, base view 140 and chat window 180. Updating persistent dashboard 130, chat window 180 and base view 140 may involve additional modules not shown, such as those of application server 340 of FIG. 3, to perform queries and access application data related to the communication command.

In action 5.2, functional control module 106 determines the communication command to be issued. In action 5.3, functional control module 106 provides the command to be issued to web server 330. Web server 330 provides a session transition command to communication server 410 and additionally executes a query similar to actions 3.2-3.6 of FIG. 3. In action 5.4*a*, functional control module 106 updates persistent dashboard 130 with context information related to the session to which transition is being made. In action 5.4*b*, functional control module 106 updates base view 140 with a reference list 166 relating to the search triggered by chat acceptance. In action 5.4*c*, functional control module 106 updates chat window 180 with relevant chat messages associated with the session. Communication server 410 then issues a chat initiation command in action 5.6, via several intermediate software modules (not shown), to media device 420.

Figure 6:
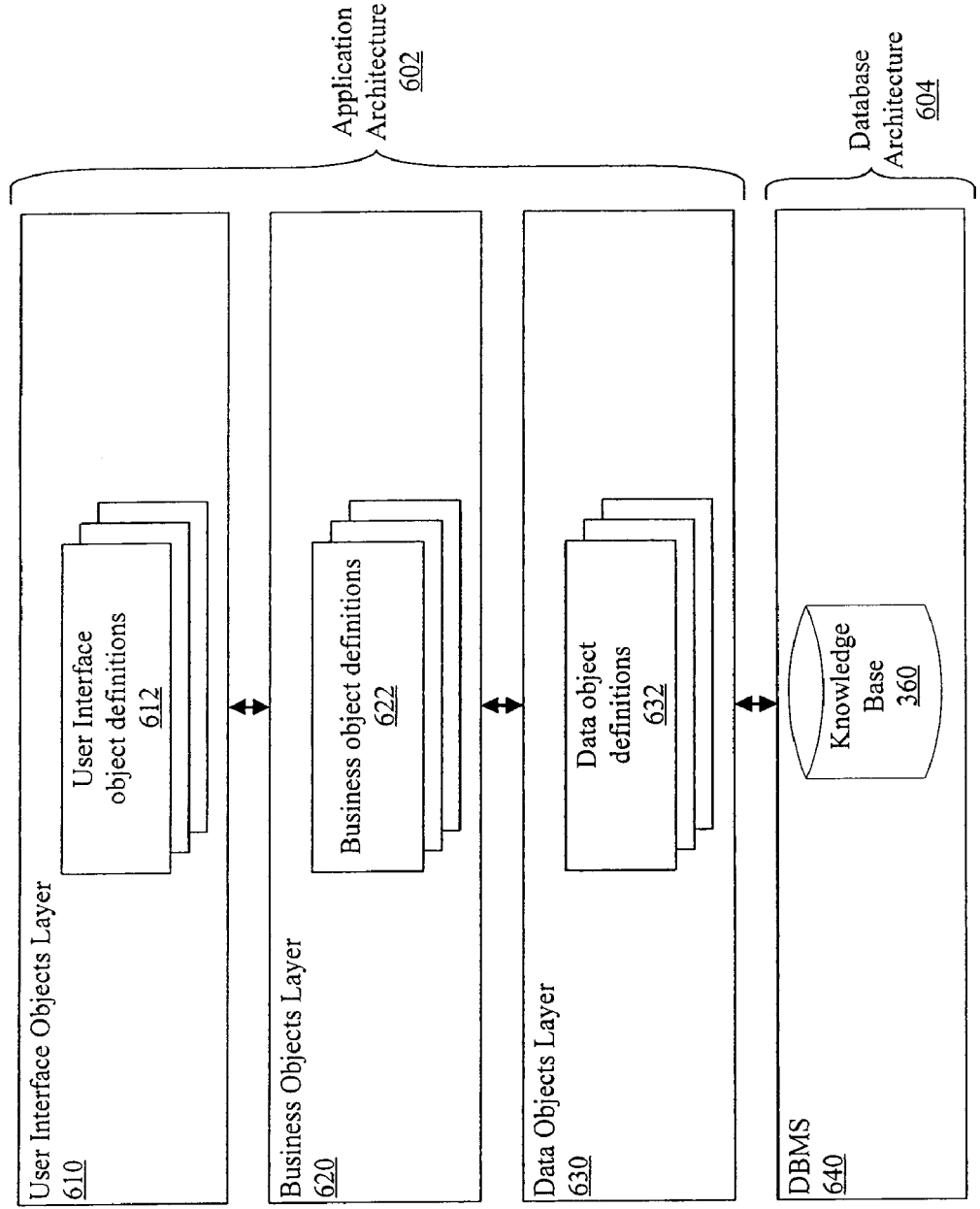
FIG. 6 is a diagram of a layered architecture in which an embodiment of the search utility can be implemented.

FIG. 6 is a diagram of a layered architecture in which an embodiment of the search utility can be implemented and support the operations depicted in FIG. 3, FIG. 4 and FIG. 5. Application architecture 602 includes user interface objects layer 610, business objects layer 620, and data objects layer 630. User interface objects layer 610 includes one or more user interface object definitions 612. An example of a user interface object definition is a view definition for base view 140. Business objects layer 620 includes one or more business object definitions 622. An example of a business object definition is a contact business object definition, which is used to populate persistent dashboard 130 and customer information pane 162. Data objects layer 630 includes one or more data object definitions 632. An example of a data object definition is a schema for a database table. Underlying database architecture 604, which is used to store application data, includes a database management system (DBMS) 640 containing knowledge base 360.

Figure 7:
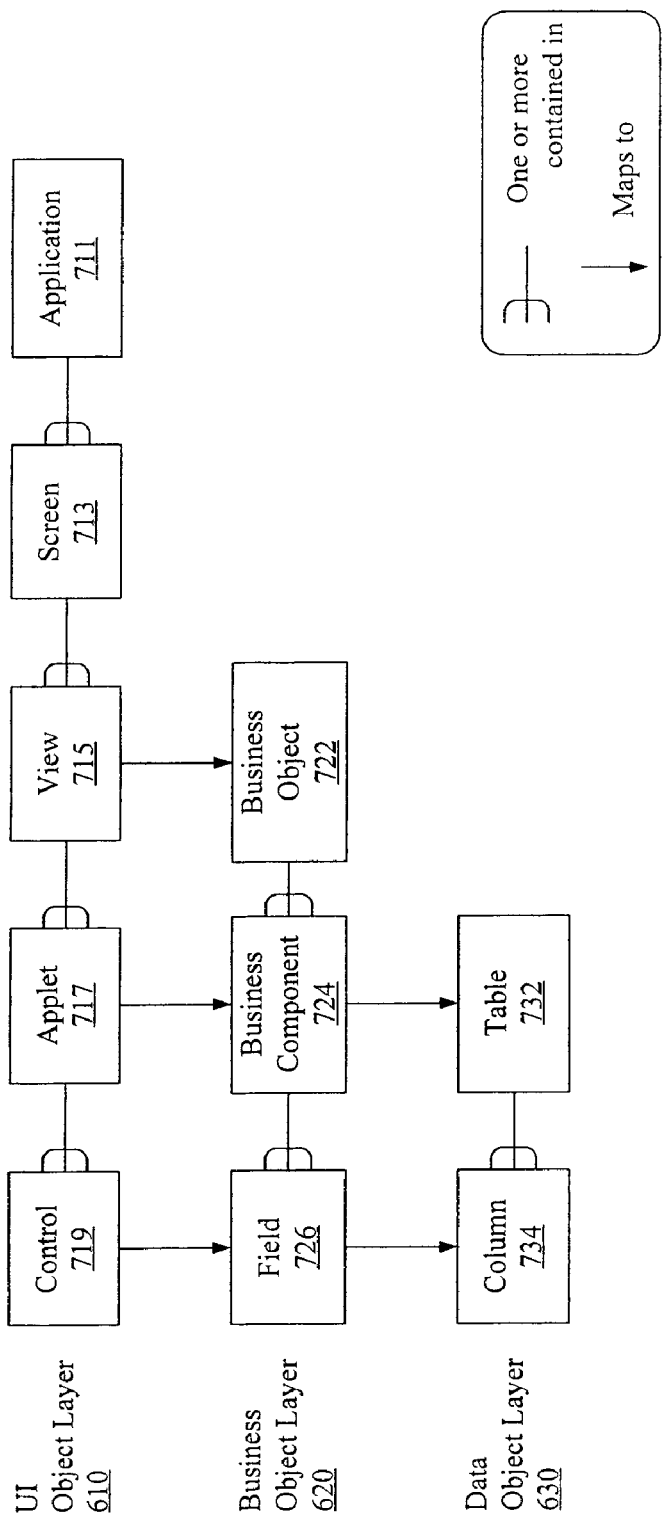
FIG. 7 is a diagram of object layers and object definitions according to the layered architecture of FIG. 6.

FIG. 7 is a diagram of object layers and object definitions according to the layered architecture of FIG. 6. User interface objects layer 610 includes object definitions application 711, screen 713, view 715, applet 717, and control 719. As used herein, an application object definition defines a collection of screens and does not define an application program. Application object definition 711 includes one or more screens 713. Each screen 713 may contain one or more view 715. A view presents one or more applets together at one time in a predefined visual arrangement and logical data relationship. Each view 715 may contain one or more applets 717. In the architecture of the present invention, the term applet is used to describe a form including one or more fields and controls, and is distinguishable from the term applet when used to describe, for example, a Java® program referred to as a Java® applet. Each applet 717 may include one or more control 719.

Business objects layer 620 includes business object definition 722, business component definition 724, and field object definition 726. Each business object definition 722 can include one or more business component object definition 724. Each business component object definition 724 may include one or more field object definition 726.

Data object layer 630 includes table object definition 732 and column object definition 734. Each table object definition 732 can include one or more column object definition 734.

As shown in FIG. 7, view object definition 715 of user interface object layer 610 maps to business object definition 722 of business objects layer 620. A mapping indicates a one-to-one relationship between objects defined according to the object definitions. For example, a contact view of agent interface 102 displays data for a contact business object.

As noted above, a view may include one or more applets, and a business object may include one or more business components. Accordingly, applets object definition 717 of user interface object layer 610 maps to business component object definition 724 of business objects layer 620. A particular applet, or form, of agent interface 102 includes data for a particular business component. Furthermore, a business component, such as business component 724, maps to an object definition, such as table object definition 732, of data objects layer 630. Consequently, a particular applet displays data for a particular business component from a particular data table. In at least one embodiment, a "virtual" business component corresponds to a business component for which data are not obtained from a single database table, but instead are the result of a combination of joins with two or more database tables.

Control object definition 719 of user interface object layer 610 maps to field object definition 726 of business objects layer 620. A particular control within an applet corresponds to a field object definition. Furthermore, field object definition 726 maps to column object definition 734 of data object layer 630. Data for a column of a particular table corresponds to a field of the corresponding business component and is displayed within a control in a corresponding applet.

A session management utility, such as screen tabs 120, can be implemented as a separate frame and view below communication toolbar 110 or as part of base view 140 or part of chat window 180. Screen tabs 120 are based on a virtual business component called "session management" which lies in the instance of a "session management" business object. Examples of object definitions related to a persistent dashboard, such as screen tabs 120, are given below:

Screen Tabs Business Object
Screen Tabs Business Component (virtual business component)
Screen Tabs Business Service (controls the functionality)
Screen Tabs Applet (user interface)
Screen Tabs View (user interface)

When updating screen tabs 120 from communication toolbar 110, a SmartScript response or an application program can use an UpdateScreenTabs application program interface (API) for the Screen Tabs Business Service. The UpdateScreenTabs API can be called using the InvokeMethod function of the Screen Tabs Business Service and passing a set of name/value pairs, such as the following:

Source Name: 'Screen Tabs'
BusComp Name: 'UpdateScreenTabs'
RowId: 'sessionlist'

In one embodiment, the InvokeMethod function of the Screen Tabs Business Service is used to call UpdateScreenTabs API for configurable events. For example, an enterprise may define a customized event for screen tabs 120 are updated and associate the customized event with a button on an applet within the agent interface.

Upon receiving the arguments, the invoked function of the Screen Tabs Business Service obtains the set of fields configured to be displayed. The involved function then retrieves corresponding data from application databases and populates screen tabs 120.

In one embodiment, screen tabs 120 are configurable. For example, various agent interface changes can be made, such as changing the color, size, location, and adding or removing fields from the display window (applet) displaying screen tabs 120.

A session management engine within the host application server is responsible for ensuring that screen tabs 120 are updated whenever a communication event occurs. In one embodiment, the session management engine is implemented as a session management business service. The session management business services provides an application program interface (API) that includes a member function to update screen tabs 120. Member functions can correspond to a command definition for a command to, for example, push incoming chat sessions to screen tabs 120. The UpdateScreenTabs API may further include a command definition for a maintain command to maintain the session information for display in screen tabs 120 until a second change in context occurs.

The communication administration views can be pre-configured to call InvokeMethod (with UpdateScreenTabs as a parameter) when a communication event is received, such as an incoming chat. Variables are passed as arguments to update screen tabs 120. When InvokeMethod is called with the UpdateScreenTabs parameter, the business service member function UpdatefromCTI obtains the list of fields that are configured to be displayed in screen tabs 120. Data to update screen tabs 120 can be passed as parameters and/or queried from appropriate application. Since the screen tabs 120 are implemented as a business service, a program calling screen tabs 120 may use a GetService ("KBSearch") command. The program may set up a control to either push information to screen tabs 120 or pull information from screen tabs 120.

Figure 8:
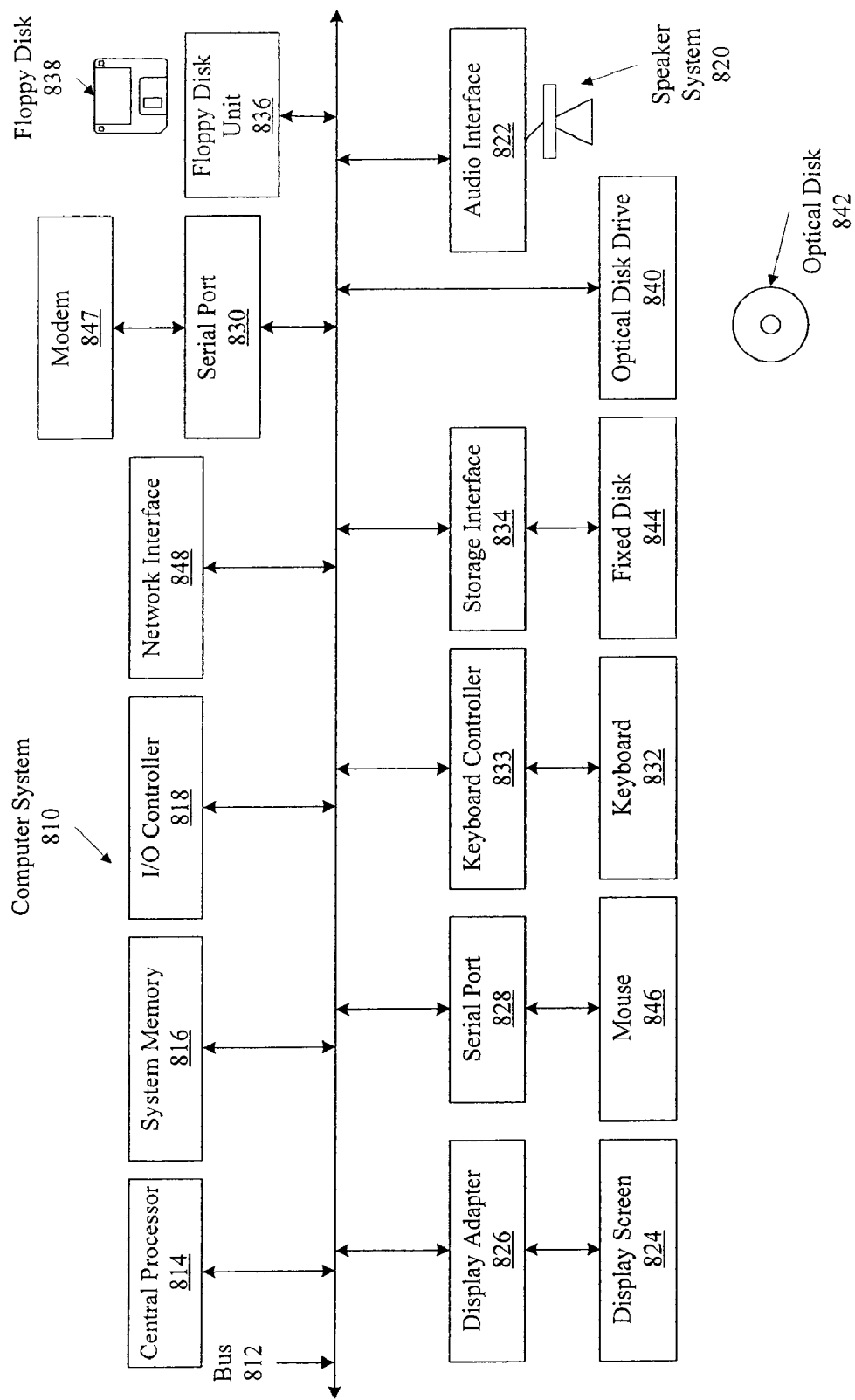
FIG. 8 is a block diagram illustrating a computer system suitable for implementing embodiments of the present invention.

FIG. 8 depicts a block diagram of a computer system 810 suitable for implementing the present invention. Computer system 810 includes a bus 812 which interconnects major subsystems of computer system 810 such as a central processor 814, a system memory 816 (typically RAM, but which may also include ROM, flash RAM, or a similar computer-readable storage medium), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834 for interfacing with a computer-readable storage medium such as a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial (or USB) port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 816 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable storage medium, such as a hard disk drive (e.g., fixed disk 844), an optical drive (e.g., CD-ROM or DVD drive 840), floppy disk unit 836 or other storage medium.

Storage interface 834, as with the other storage interfaces of computer system 810, may connect to a standard computer readable storage medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliances, X-window terminals or other such computing devices. The operating system provided on computer system 810 may be MS-WINDOWS®, Mac OS 10®, UNIX®, Linux® or other known operating system. Computer system 810 also supports a number of Internet access tools, including, for example, an HTTP-compliant web browser having a JavaScript interpreter.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of media used to actually carry out the distribution. Examples of signal bearing media include recordable media such as floppy disks and CD-ROM, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   recording a first transition by an agent interface, wherein
      said first transition is a transition between a first session and a second session of a plurality of sessions in a communication utility, and
      said first transition is recorded in a transition record;
   responsive to receipt of a request to initiate a third session by said communication utility, determining a transition frequency using said transition record;
   determining whether to accept said request to initiate said third session, wherein said determining whether to accept said request to initiate said third session uses said transition frequency; and accepting said request to initiate said third session if said determining indicates said request should be accepted.

2. The method of claim 1, further comprising:

responsive to said first transition, recording a status of said agent interface for said first session; and responsive to a second transition from said second session to said first session, restoring said status of said agent interface.

3. The method of claim 2, further comprising:

responsive to receiving a transmission intended for said first session, updating said status of said agent interface for said first session to reflect said transmission; and displaying an alert within said agent interface, wherein said alert is with regard to said transmission.

4. The method of claim 3, further comprising:

displaying a reminder of said first session and said second session; and responsive to interaction with said reminder, displaying said transmission.

5. The method of claim 2, further comprising:

displaying an alert, wherein
said alert indicates said request to initiate said third session, and
said communication utility is a pseudo-real-time text communication utility;

determining an agent efficiency based on said transition frequency; and reporting said agent efficiency.

6. The method of claim 5, wherein said reporting said agent efficiency further comprises:

reporting said agent efficiency to a communication server.

7. The method of claim 2, wherein said recording said status of said agent interface for said first session further comprises: recording a status of a search window.

8. A computer-readable storage medium, comprising:

a first set of instructions, executable by a processor, configured to record a first transition by an agent interface, wherein
said first transition is a transition between a first session and a second session of a plurality of sessions in a communication utility, and
said first transition is recorded in a transition record;

a second set of instructions, executable by said processor, configured to responsive to receipt of a request to initiate a third session by said communication utility, determine a transition frequency using said transition record;

a third set of instructions, executable by said processor, configured to determine whether to accept said request to initiate said third session, wherein
said determining whether to accept said request to initiate said third session uses said transition frequency; and a fourth set of instructions, executable by said processor, configured to accept said request to initiate said third session if said determining by said third set of instructions indicates said request should be accepted.

9. The computer-readable storage medium of claim 8, further comprising:

a fifth set of instructions, executable by said processor, configured to, responsive to said first transition, record a status of said agent interface for said first session; and a sixth set of instructions, executable by said processor, configured to, responsive to a second transition from said second session to said first session, restore said status of said agent interface.

10. The computer-readable storage medium of claim 9, further comprising:

a seventh set of instructions, executable by said processor, configured to, responsive to receiving a transmission intended for said first session, update said status of said agent interface for said first session to reflect said transmission; and an eighth set of instructions, executable by said processor, configured to display an alert within said agent interface, wherein
said alert is with regard to said transmission.

11. The computer-readable storage medium of claim 10, further comprising:

a ninth set of instructions, executable by said processor, configured to display a reminder of said first session and said second session; and a tenth set of instructions, executable by said processor, configured to, responsive to interaction with said reminder, display said transmission.

12. The computer-readable storage medium of claim 9, further comprising:

an eleventh set of instructions, executable by said processor, configured to determine an agent efficiency based on said transition frequency;

a twelfth set of instructions, executable by said processor, configured to report said agent efficiency, wherein
said communication utility is a pseudo-real-time text communication utility; and a thirteenth set of instructions, executable by said processor, configured to display an alert, wherein
said alert indicates said request to initiate said third session.

13. The computer-readable storage medium of claim 12, wherein said twelfth set of instructions is configured to report said agent efficiency to a communication server.

14. The computer-readable storage medium of claim 9, wherein said fifth set of instructions is configured to store a state of a search window.

15. A system comprising:

one or more processors; and a memory coupled to said one or more processors, wherein said memory stores program instructions executable by said one or more processors to:
record a first transition by an agent interface, wherein
said first transition is a transition between a first session and a second session of a plurality of sessions in a communication utility, and
said first transition is recorded in a transition record;
responsive to receipt of a request to initiate a third session by said communication utility, determine a transition frequency using said transition record;
determine whether to accept said request to initiate said third session, wherein
said determining whether to accept said request to initiate said third session uses said transition frequency; and
accept said request to initiate said third session if said determining indicates said request should be accepted.

16. The system of claim 15, wherein the program instructions are further executable to:

responsive to said first transition, record a status of said agent interface for said first session; and responsive to a second transition from said second session to said first session, restore said status of said agent interface.

17. The system of claim 16, wherein the program instructions are further executable to:
responsive to receiving a transmission intended for said first session, update said status of said agent interface for said first session to reflect said transmission; and
display an alert within said agent interface, wherein said alert is with regard to said transmission.

18. The system of claim 17, wherein the program instructions are further executable to:
display a reminder of said first session and said second session; and
responsive to interaction with said reminder, display said transmission.

19. The system of claim 16, wherein the program instructions are further executable to:
determine an agent efficiency based on said transition frequency; and
report said agent efficiency, wherein said communication utility is a pseudo-real-time text communication utility.

20. The system of claim 19, wherein the program instructions are further executable to:
report said agent efficiency to a communication server.

* * * * *